United States Patent
Warfen et al.

(10) Patent No.: US 10,167,848 B2
(45) Date of Patent: Jan. 1, 2019

(54) METHOD AND SYSTEM FOR MONITORING AN INDIVIDUAL BLADE ADJUSTMENT OF A WIND TURBINE

(71) Applicant: SENVION GMBH, Hamburg (DE)

(72) Inventors: Karsten Warfen, Söhren (DE); Lothar Hendus, Kiel (DE); Sören Bilges, Hamburg (DE); Henning Leweke, Heikendorf (DE)

(73) Assignee: Senvion GmbH, Hamburg (DE)

(*) Notice: Subject to any disclaimer, the term of this patent is extended or adjusted under 35 U.S.C. 154(b) by 437 days.

(21) Appl. No.: 14/852,581

(22) Filed: Sep. 13, 2015

(65) Prior Publication Data

US 2016/0003220 A1    Jan. 7, 2016

Related U.S. Application Data

(63) Continuation of application No. PCT/EP2014/000563, filed on Mar. 5, 2014.

(30) Foreign Application Priority Data

Mar. 14, 2013   (DE) ................ 10 2013 204 492

(51) Int. Cl.
   F03D 7/02       (2006.01)
   F03D 17/00      (2016.01)
(52) U.S. Cl.
   CPC .......... F03D 7/0224 (2013.01); F03D 17/00 (2016.05); F05B 2270/328 (2013.01); Y02E 10/721 (2013.01); Y02E 10/723 (2013.01)
(58) Field of Classification Search
   CPC .. F03D 7/0224; F03D 17/00; F05B 2270/328; Y02E 10/721; Y02E 10/723
   (Continued)

(56) References Cited

U.S. PATENT DOCUMENTS 7,629,702 B2 * 12/2009 Schubert ............... F03D 7/0224
                                              290/44
2008/0290664 A1    11/2008 Kruger
(Continued)

FOREIGN PATENT DOCUMENTS

CN    101720387 A    6/2010
DE    10011393 A1    9/2001
(Continued)

OTHER PUBLICATIONS

International Search Report dated May 8, 2014 in corresponding International Patent Application No. PCT/EP2014/000563.

*Primary Examiner* — Robert E Fennema
*Assistant Examiner* — Christopher W Carter
(74) *Attorney, Agent, or Firm* — Rankin, Hill & Clark LLP

(57) ABSTRACT

The invention relates to a method and a system for monitoring an individual blade adjustment of a wind turbine which includes a tower, a rotor which is arranged on the tower and has at least two rotor blades whose blade angle can be adjusted individually, and a blade adjustment system, wherein the blade adjustment system includes a blade controller and sensors for sensing individual actual blade angles of the at least two rotor blades, wherein an individual blade controller is included which receives a collective set point blade angle from the blade controller and which actuates at least two rotor blades with respectively individual set point blade angles, as well as a corresponding wind turbine.

9 Claims, 3 Drawing Sheets

(58) Field of Classification Search
USPC .......................................................... 700/292
See application file for complete search history.

(56) References Cited

U.S. PATENT DOCUMENTS

| | | |
|---|---|---|
| 2010/0014971 A1 | 1/2010 | Risager et al. |
| 2011/0158805 A1 | 6/2011 | Miranda et al. |
| 2011/0229300 A1* | 9/2011 | Kanev .................. F03D 7/0224 415/1 |

FOREIGN PATENT DOCUMENTS

| | | |
|---|---|---|
| DE | 102005034899 A1 | 2/2007 |
| DE | 102006021982 A1 | 11/2007 |
| DE | 102008057934 A1 | 5/2010 |
| DE | 102009022236 A1 | 11/2010 |

* cited by examiner

METHOD AND SYSTEM FOR MONITORING AN INDIVIDUAL BLADE ADJUSTMENT OF A WIND TURBINE

CROSS-REFERENCE TO RELATED APPLICATIONS

This application is a continuation of International Application No. PCT/EP2014/000563, filed Mar. 5, 2014, and claims priority to DE 10 2013 204 492.5, filed Mar. 14, 2013.

BACKGROUND OF INVENTION

Field of Invention

The invention relates to a method and a system for monitoring an individual blade adjustment of a wind turbine which comprises a tower, a rotor which is arranged on the tower and has at least two rotor blades whose blade angle can be adjusted individually, and a blade adjustment system, wherein the blade adjustment system comprises a blade controller and sensors for sensing individual actual blade angles of the at least two rotor blades, wherein an individual blade controller is included which receives a collective set point blade angle from the blade controller and which actuates at least two rotor blades with respectively individual set point blade angles, as well as a corresponding wind turbine.

Brief Description of Related Art

Wind turbines with power regulation by adjusting the rotor blades have devices which monitor the correct position of the individual rotor blades for, inter alia, symmetry and error deviation. In addition, it is necessary to detect faults such as, for example, the uncontrolled and random adjustment of one or more rotor blades. In regulating concepts with individual blade adjustment, that is to say independent adjustment of the individual rotor blades, large asymmetries are intentionally generated. This makes particular demands of the monitoring of the individual blade adjustment.

For this purpose, the set point values of the blade angles are usually monitored as a manipulated variable and the actual values are monitored as measured values of the usually two or three, and in the case of relatively small systems even more, individual rotor blade angles for deviations. Furthermore, the asymmetries are monitored by comparing the individual actual values of the individual blade angles for deviations from one another. Finally, absolute limits of the rotor blade angles, usually minimal values, are monitored for upward transgressions. These monitoring operations bring about deactivation of the wind turbine when triggering occurs.

Particularly for large offshore systems or in the case of high offshore towers it is increasingly important to use an individual blade adjustment or "individual pitch control" (IPC) to reduce the mechanical loads. In the IPC, relatively pronounced blade angle asymmetries are generated. Loosening of the monitoring settings in amplitude and time during the previously used monitoring methods for symmetrical blade actuations would lead to unacceptable increases in mechanical loads in specific situations or load cases.

BRIEF SUMMARY OF THE INVENTION

In contrast with this prior art, the present invention is based on the object of making available a method and a system for monitoring an individual blade adjustment of a wind turbine and a corresponding wind turbine which easily permit safe and efficient operation of the wind turbine with individual blade adjustment.

This object is achieved by means of a method for monitoring an individual blade adjustment of a wind turbine which comprises a tower, a rotor which is arranged on the tower and has at least two rotor blades whose blade angle can be adjusted individually, and a blade adjustment system, wherein the blade adjustment system comprises a blade controller and sensors for sensing individual actual blade angles of the at least two rotor blades, wherein an individual blade controller is included which receives a collective set point blade angle from the blade controller and actuates the at least two rotor blades with respectively individual set point blade angles, which is further formed in that at least one difference signal is formed by forming the difference between at least two different blade angle collective signals and is monitored to determine whether at least one limiting value is exceeded in absolute terms, wherein the at least one difference signal which is to be monitored and/or the blade angle collective signals on which the formation difference is based and/or the individual blade angle signals which serve as a basis for one or more blade angle collective signals is/are averaged over time.

In contrast to the prior art, in each case the individual signals are no longer monitored but instead collective signals which describe a state of the collective of the rotor blades, specifically on the actual side and/or on the set point side, are formed or used. In addition, averaging over time is carried out in order to compensate for turbulent faults or measuring errors. The averaging over time can be applied to the original signals, to the difference signal or to intermediate signals such as the actual mean value or the set point mean value.

This monitoring is based on the basic idea that the individual blade adjustment (IPC) generates relatively pronounced blade angle asymmetries, wherein these asymmetries are shifted from blade to blade with a virtually identical phase, but the respective mean values of the two, three or more set point angles and the actual angle have to be the same or can differ from one another only in accordance with the inertia or the delay times of the blade angle adjustment system.

Likewise, the collective set point blade angle from the blade controller can be compared, as a collective signal, for example with the mean value of the actual blade angles or the set point blade angles from the individual blade adjustment (IPC), in order to check different fault states.

An actual mean value of the actual blade angles, a set point mean value of individual-blade-control-based individual blade angles and/or the collective set point blade angles are preferably used as blade angle collective signals. A comparison of the actual mean value with the set point mean value of individual-blade-control-based individual blade angles therefore serves for checking the mechanical components of the adjustment system, for example pitch drives and blade bearings. A comparison of the set point mean value with the collective set point blade angle which is output by the blade controller serves to check the function of the IPC. A pitch drive or blade adjustment drive usually comprises one or more motors, transmissions, pinions, which meshes or mesh with a toothing arrangement on the blade bearing, and a brake.

In order to calculate the set point mean value, averaging is preferably carried out over the individual set point blade angles of the individual blade controller and/or a response of the blade adjustment system to the requested individual set point blade angles is simulated, and averaging is carried out over the simulated individual blade angles of the simulated blade adjustment system.

In the first case, simple averaging of the individual set point blade angles is carried out from the IPC with which, in particular, either the actual mean value or the collective set point blade angle is performed in order to check the mechanical components or the IPC itself. For this purpose, the corresponding limiting values are set in such a way that the customary delays of the adjustment system are taken into account.

Yet more sensitive parameterization of the monitoring is obtained if the blade adjustment system is modeled and simulated and the set point mean value is determined on the basis of the simulation. This simulation already takes into account the inertia of the adjustment system. In this way, the delay in the blade angle adjustment after the respective request for changed individual blade angles is already taken into account in the calculation of the set point mean value of individual-blade-control-based individual blade angles. In this case, the limiting values can be defined correspondingly more tightly. If the adjustment system has more delays in this case than the simulated case, it is therefore possible to determine a malfunction of the mechanical components, that is to say for example of the adjustment drives and blade bearings, in a sensitive way. The simulation can be optimized in the scope of the invention during the satisfactory operation. In this context, the response to the adjustment system to adjustment interrogations can be routinely adapted to the real system by measuring the response times and response speeds.

The averaging-over-time operation or operations is/are preferably carried out over an averaging duration which is less than a duration of half a rotor revolution, in particular between 0.5 seconds and 2 seconds, in particular preferably 1 second. This averaging duration is long enough to compensate for the dynamic behavior of the system, and short enough to detect a detection of malfunctions of the mechanical components of the adjustment system or of the IPC itself. Such load cases occur predominantly only briefly, with the result that a relatively long averaging duration would lead to a situation in which they are no longer detected.

The operation of the wind turbine is preferably reduced with respect to the load or stopped if the at least one generated blade angle difference signal exceeds the at least one limiting value in absolute terms. It is therefore possible to react to the discovered load case appropriately in terms of the situation. The degree of load reduction or the decision that the operation of the wind turbine is stopped can be implemented here as a function of the type and severity of the discovered load case.

In one preferred embodiment, a difference signal is generated from the collective actual mean value and the collective set point mean value, and in the event of a limiting value being exceeded in absolute terms a malfunction of a blade adjustment drive or of a blade bearing is determined. This case corresponds to a malfunction of the mechanism, that is to say of the blade adjustment drives or blade bearings, of the blade adjustment system. In this context, the collective set point mean value can either be the mean value of the individual set point individual blade angles or a mean value of the simulated individual blade angles in response to the set point individual blade angles.

In one alternative or additional monitoring operation, there is also advantageously provision that a difference signal is generated from a collective set point mean value and the collective set point blade angle, and in the event of a limiting value being exceeded in absolute terms a malfunction of the individual blade controller is determined. In this case, the collective set point mean value is preferably the mean value of the set point individual blade angles from the IPC. Since two set point values are compared with one another in this case, the delay of the mechanical components of the blade adjustment system is ignored by this measure.

As a result of the monitoring just mentioned, incorrect calculations of the blade-specific manipulated variables are detected by the IPC controller. This involves in principle monitoring the symmetry of the individual set point values which must always occur within a limited band. The two monitoring operations can also be combined into one monitoring operation, wherein the actual mean value can also be compared with the collective set point blade angle. With this monitoring, the mechanical components and the method of functioning of the IPC controller are monitored at the same time.

In a further alternative or additional advantageous monitoring operation, a difference signal is preferably generated from the collective set point blade angle and the collective actual mean value, and in the event of a limiting value being exceeded in absolute terms a malfunction of the individual blade adjustment is determined. In this way, all the individual interrogations are combined into a single checking interrogation, wherein this is at the cost of component-system-specific fault analysis. All the monitoring operations described can be implemented appropriately individually or, in particular in any combination as required, in a monitoring method according to the invention.

The monitoring according to the method according to the invention permits the normal production operation and taking into account of customary tolerances of specific states of the production operation with faulty blade adjustment activity to be differentiated significantly more quickly than hitherto. Inter alia, a random movement of individual, in particular two, blades in the direction of 0° blade angles can be detected by several 100 ms more quickly than hitherto. This monitoring contributes to allowing the system types which are considered in the IPC development to be operated very largely without a critical change in the extreme loads.

This method monitors better not only in the case of a randomly moved rotor blade but also the general property of the IPC operation. In terms of control technology, the difference calculated here in the case of individual blade adjustment must have the target value 0 (zero).

As a result of the division into two monitoring operations, when triggering occurs, it is possible to differentiate between a malfunction of the control and one of the drive system. The triggering criteria, the averaging time and the triggering delay can therefore be well adapted individually.

The object on which the invention is based is also achieved by means of a system for monitoring an individual blade adjustment of a wind turbine which comprises a tower, a rotor which is arranged on the tower and has at least two rotor blades whose blade angles can be adjusted individually, and a blade adjustment system, wherein the blade adjustment system comprises a blade controller, and blade angle sensors for sensing individual actual blade angles of the at least two rotor blades, wherein the blade controller comprises an individual blade controller which receives a collective set point blade angle from the blade controller and actuates the at least two rotor blades with respectively individual set point blade angles, wherein the system has a monitoring device, which is further formed in that the monitoring device is designed and configured to form at least one difference signal by forming a difference between at least two different blade angle collective signals and to monitor to determine whether at least one limiting value is exceeded in absolute terms, and to average over time at least one difference signal which is to be monitored and/or the blade angle collective signals ($\overline{\theta^{act}}$, $\overline{\theta^{IPC}}$, $\theta_c^{set}$) on which the formational difference is based and/or the individual blade angle signals ($\theta_i^{act}$, $\theta_i^{IPC}$, $\theta_i^{sim}$) which serve as a basis for one or more blade angle collective signals ($\overline{\theta^{act}}$, $\overline{\theta^{IPC}}$).

With this definition, the system provides the same performance as the method according to the invention and shares its features, advantages and properties. For this purpose, the monitoring device preferably has means, is designed and configured to carry out a method according to the invention as described above.

The monitoring device is advantageously integrated into an operational control system or into the blade adjustment system of the wind turbine.

Finally, the object on which the invention is based is also achieved by a wind turbine having a tower, a rotor which is arranged on the tower and has at least two rotor blades whose blade angle can be adjusted individually, and a blade adjustment system which comprises a blade controller and blade angle sensors for sensing individual actual blade angles of the at least two rotor blades, wherein the blade controller comprises an individual blade controller which receives a collective set point blade angle from the blade controller and which actuates at least two rotor blades with respectively individual set point blade angles, which is further formed in that the wind turbine has a system as described above for monitoring the individual blade adjustment.

The wind turbine also has the properties, advantages and features of the method according to the invention and system according to the invention as described above.

Further features of the invention are apparent from the description of inventive embodiments together with the claims and the appended drawings. Inventive embodiments can satisfy individual features or a combination of a plurality of features.

BRIEF DESCRIPTION OF THE DRAWINGS

The invention will be described below without limitation to the general inventive concept on the basis of exemplary embodiments and with respect to the drawings, wherein reference is made expressly to the drawings in respect of the inventive details which are not explained in more detail in the text. In the drawings.

In the drawings, respectively identical or similar elements and/or parts are provided with the same reference symbols, and a repeated presentation is therefore respectively omitted.

DETAILED DESCRIPTION OF THE INVENTION

Figure 1:
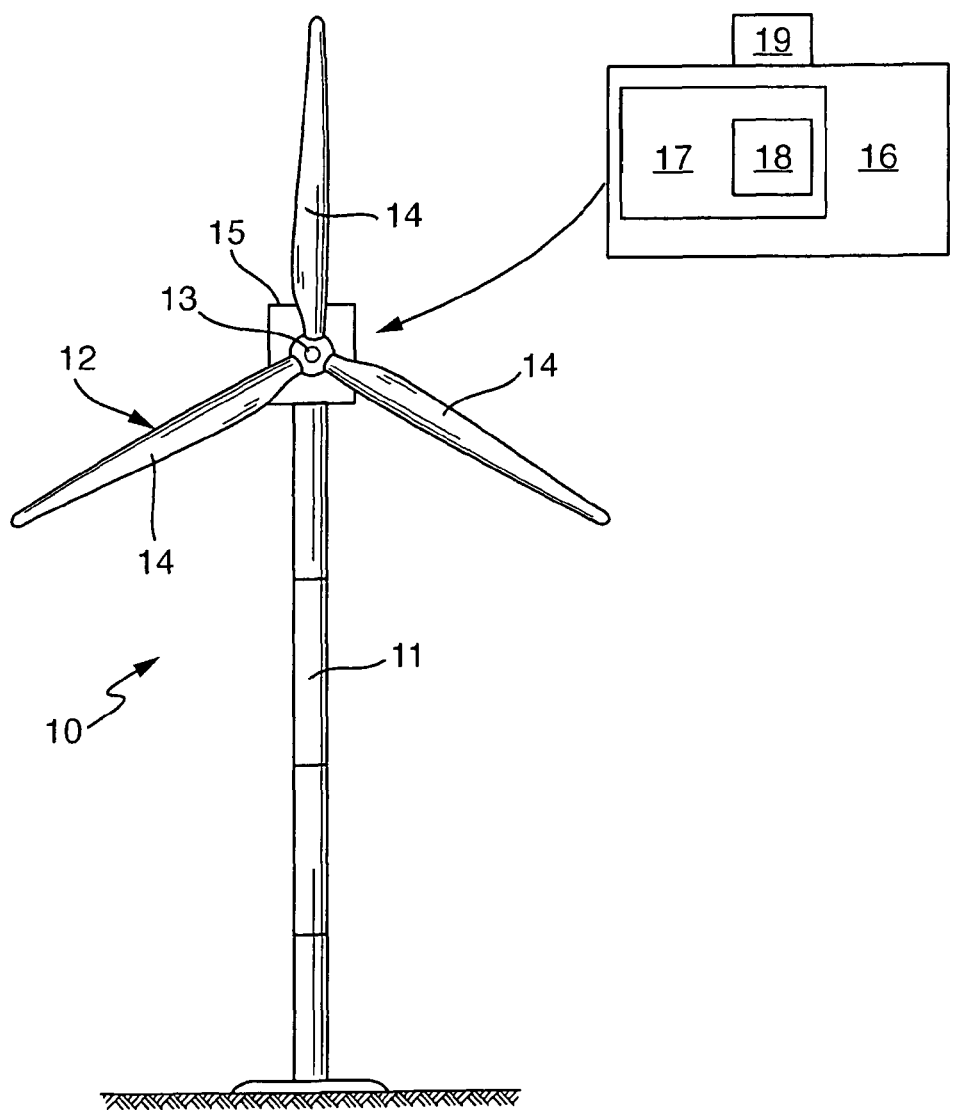
FIG. 1 shows a schematic illustration of a wind turbine.

FIG. 1 shows a schematic illustration of a wind turbine 10. The wind turbine 10 has a tower 11 and a rotor 12 which comprises three rotor blades 14 which are mounted on a rotor hub 13. The rotor hub 13 drives a generator (not illustrated) which is arranged in a gondola 15 at the tip of the tower 11. When there is wind, the rotor 12 rotates into the wind through an azimuthal rotation. As a result, power can be generated by the generator and output into the consumer network.

The wind turbine 10 also comprises a schematically illustrated operational control system 16 which is implemented in electronic control components in the gondola 15 or else in the tower or in the foot of the tower. The operational control system comprises a blade controller 17 which itself in turn comprises an individual blade controller 18 for the rotor blades 14. In addition, a monitoring device 19 is provided for the rotor blade adjustment system which can be implemented individually or can be embodied in the operational control system 16 or the blade controller 17.

For rotor blade adjustment, the blade controller 17 outputs a collective set point blade angle $\theta_c^{set}$ which is adapted to the instantaneous wind strength and power generation. The individual blade controller 18 which is included in the blade controller 17 processes this set point blade angle $\theta_c^{set}$ and outputs three individual set point individual blade angles $\theta_i^{IPC}$, on the basis of which the rotor blades 14 are adjusted in their rotation. These set point individual blade angles $\theta_i^{IPC}$ oscillate about the collective set point blade angle $\theta_c^{set}$.

Figure 2:
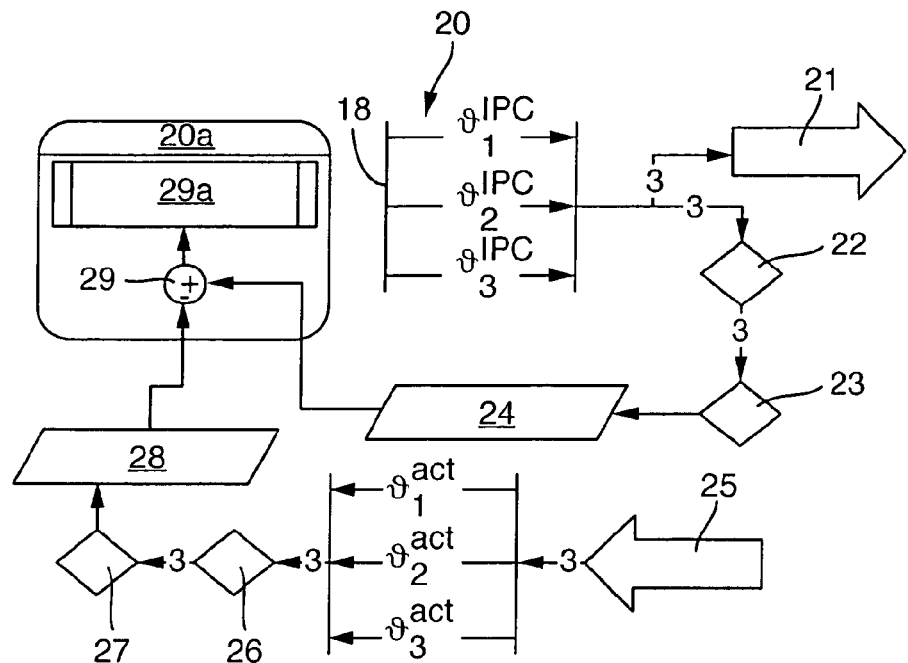
FIG. 2 shows a schematic illustration of a first exemplary embodiment of a monitoring scheme according to the invention.

FIG. 2 is a schematic illustration of a first exemplary embodiment of a monitoring scheme 20 according to the invention. The monitoring scheme 20 comprises a status message 20a which can indicate normal operation of the adjustment system or that a limiting value for the monitoring operation shown is being exceeded.

In order to carry out the monitoring, the respective set point individual blade angle $\theta_1^{IPC}$, $\theta_2^{IPC}$, $\theta_3^{IPC}$ is initially formed in the individual blade controller 18 from the collective set point blade angle $\theta_c^{set}$ and passed on 21 to the rotor hub 13. The number "3" in the corresponding arrow means in this context that three individual values are transferred. The three individual set point individual blade angles $\theta_1^{IPC}$, $\theta_2^{IPC}$ and $\theta_3^{IPC}$ are also averaged 22 over time and subsequently averaged 23 over the individual set point individual blade angles averaged over time, i.e. to form a collective set point mean value $$\overline{\theta^{IPC}} = \frac{\left(\sum_{i=1}^{3} \theta_i^{IPC}\right)}{3}.$$

The collective set point mean value $\overline{\theta^{IPC}}$ is subsequently fed to a difference forming means 29 in the method step 24.

Parallel to this, three individual actual blade angles $\theta_1^{act}$, $\theta_2^{act}$ and $\theta_3^{act}$ ("act" stands for "actual") sensed in the method step 25 are averaged over time in the method step 26 by the rotor hub 13 or corresponding suitable blade angle sensors, and in the method step 27 an actual $$\overline{\theta^{act}} = \frac{\left(\sum_{i=1}^{3} \theta_i^{act}\right)}{3}$$

is formed from the three individual actual blade angles averaged over time $\theta_i^{act}$. This actual mean value $\overline{\theta^{act}}$ is subsequently also passed on to the difference forming means 29 in the method step 28.

In the difference forming means 29, the difference is formed between the collective IPC set point mean value $\overline{\theta^{IPC}}$ and the collective actual mean value $\overline{\theta^{act}}$ and checked 29a. This difference signal from the difference forming means 29 is compared during the check 29a with a limiting value, the absolute value of the difference signal is compared with the limiting value and when the limiting value is exceeded the status message 20a is changed to the effect that a fault in the adjustment system is displayed. This can lead to a reduction in the load or to the deactivation of the wind turbine.

Figure 3:
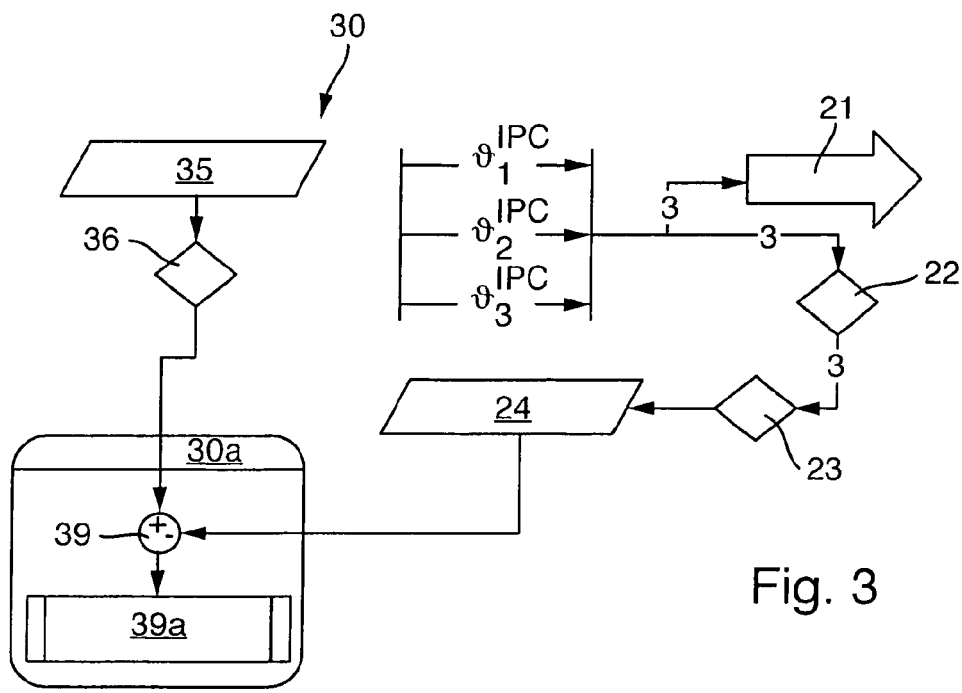
FIG. 3 shows a schematic illustration of a second exemplary embodiment of a monitoring scheme according to the invention.

FIG. 3 illustrates an alternative monitoring scheme 30 which can also be used together with the monitoring scheme 20 or in addition thereto. One part relates to the formation, already known from FIG. 2 of the IPC set point mean value $\overline{\theta^{IPC}}$ from the individual IPC set point blade angles $\theta_1^{IPC}$, $\theta_2^{IPC}$ and $\theta_3^{IPC}$. This IPC set point mean value $\overline{\theta^{IPC}}$ is passed on to a difference forming means 39.

The second value which is fed to the difference forming means 39 is the collective blade angle set point value $\theta_c^{set}$ in the method step 35, which value is averaged over time in the method step 36 and subsequently fed to the difference forming means 39. The difference signal which is formed in the difference forming means 39 from the collective blade angle set point value $\theta_c^{set}$ and the collective set point mean value $\overline{\theta^{IPC}}$ from the individual blade controller is subsequently checked 39a, and when a corresponding limiting value is exceeded the status message 30a is changed to the effect that a fault is present in the individual blade controller. In this way, the function of the IPC controller is monitored.

Figure 4:
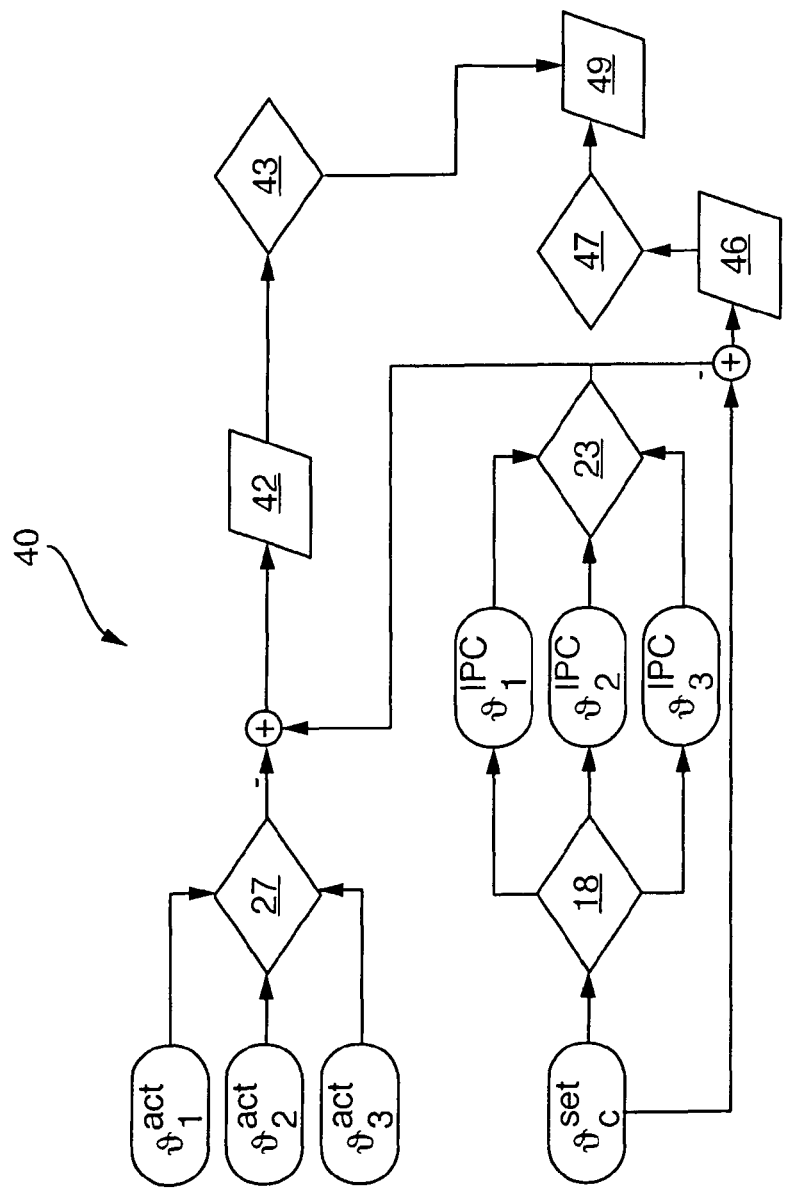
FIG. 4 shows a schematic illustration of a third exemplary embodiment of a monitoring scheme according to the invention.

In a third exemplary embodiment according to FIG. 4, two different monitoring operations are carried out at the same time. In the upper branch, a mean value, specifically the actual mean value $\overline{\theta^{act}}$ is formed in the method step 27 from the individual actual blade angles $\theta_1^{act}$, $\theta_2^{act}$ and is fed to a difference forming means. The second signal, which is fed to this difference forming means, originates from individual, IPC set point individual blade angles $\theta_1^{IPC}$, $\theta_2^{IPC}$ and $\theta_3^{IPC}$ which are formed at the method step 23 and originate from the individual blade controller 18 whose input was the collective set point blade angle $\theta_c^{set}$.

The difference between the collective IPC set point mean value $\overline{\theta^{IPC}}$ determined in the method step 23 and the collective actual mean value $\overline{\theta^{act}}$ is averaged over time in the method step 42 and subjected to checking in the method step 43. When a limiting value is exceeded by the absolute value of this difference signal averaged over time, the system is deactivated or the load is reduced in the method step 49.

A second checking process in the lower region of the monitoring scheme 40 in FIG. 4 produces a difference between the collective set point blade angle $\theta_c^{set}$ and the collective IPC set point mean value $\overline{\theta^{IPC}}$ formed in the method step 23. This difference is averaged over time in the method step 46, and the value which is averaged over time is checked in the method step 47. The wind turbine 10 is deactivated or the load reduced in the method step 49 if one of the two monitoring operations shows that the absolute value of the respective difference signal which is averaged over time exceeds a limiting value.

All the specified features and also the features which can be found solely in the drawings and also individual features which are disclosed in combination with other features are to be considered as essential to the invention both alone and in combination. Inventive embodiments can also be satisfied by individual features or a combination of a plurality of features.

LISTING OF REFERENCE SYMBOLS APPEARING IN ACCOMPANYING DRAWING FIGURES

10 Wind turbine
11 Tower
12 Rotor
13 Rotor hub
14 Rotor blades
15 Gondola
16 Operational control system
17 Blade controller
18 Individual blade controller
19 Monitoring device
20 Monitoring scheme
20a Status message
21 IPC set point blade angle at hub
22 Averaging of the IPC set point blade angles over time
23 Mean value formation
24 Result $\overline{\theta^{IPC}}$ for the formation of differences
25 Sensing actual blade angle at hub
26 Averaging of the actual blade angles over time
27 Formation of mean values
28 Result $\overline{\theta^{act}}$ for the formation of differences
29 Difference forming means
29a Check
30 Monitoring scheme
30a Status message
35 Collective blade angle set point value
36 Averaging over time
39 Difference forming means
39a Check
40 Monitoring scheme
42 Averaging over time
43 Check
46 Averaging over time
47 Check
49 Deactivation or reduction of load
$\theta_i^{act}$ Individual actual blade angles
$\theta_i^{IPC}$ Individual set point individual blade angles from IPC
$\theta_i^{sim}$ Individual blade angles from IPC-based simulation
$\overline{\theta^{act}}$ Collective actual mean value
$\overline{\theta^{IPC}}$ Collective set point mean value from IPC
$\theta_c^{set}$ Collective set point blade angle from blade controller

What is claimed is:

1. A method for operating a wind turbine that includes
a tower,
a rotor arranged on the tower having at least two rotor blades, wherein of each of said at least two rotor blades has an individually adjustable blade angle,
a blade adjustment system that includes a blade controller and sensors for sensing individual actual blade angles $\theta_i^{act}$ of the at least two rotor blades, and
an individual blade controller configured to receive a collective set point blade angle $\theta_c^{set}$ from the blade controller and to actuate the at least two rotor blades with individual set point blade angles $\theta_i^{IPC}$, respectively,
the method comprising:
forming a difference signal based upon a difference between
(a) a collective blade angle actual mean value $\overline{\theta^{act}}$ and a collective blade angle set point mean value $\overline{\theta^{IPC}}$;
(b) the collective set point mean value $\overline{\theta^{IPC}}$ and the collective set point blade angle $\theta_c^{set}$; or (c) the collective set point blade angle $\theta_c^{set}$ and a collective actual mean value $\overline{\theta^{act}}$;

averaging the difference signal over time to obtain an averaged over time value;

monitoring the averaged over time value to determine whether at least one limiting value is exceeded in absolute terms; and reducing an operation of the wind turbine with respect to load when the averaged over time value exceeds the at least one limiting value in absolute terms and determining a malfunction of:
  (i) a blade adjustment drive or a blade bearing where the difference signal is based upon the difference between (a) the collective blade angle actual mean value $\overline{\theta^{act}}$ and the collective blade angle set point mean value $\overline{\theta^{IPC}}$; or
  (ii) the individual blade controller where the difference signal is based upon the difference between either (b) the collective set point mean value $\overline{\theta^{IPC}}$ and the collective set point blade angle $\theta_c^{set}$ or (c) the collective set point blade angle $\theta_c^{set}$ and the collective actual mean value $\overline{\theta^{act}}$.

2. The method according to claim 1, wherein in order to calculate the set point mean value $\overline{\theta^{IPC}}$, averaging is carried out over the individual set point blade angles $\theta_i^{IPC}$ of the individual blade controller or a response of the blade adjustment system to the requested individual set point blade angles $\theta_i^{IPC}$ is simulated, and averaging is carried out over the simulated individual blade angles $\theta_i^{sim}$ of the simulated blade adjustment system.

3. The method according to claim 1, wherein in order to calculate the set point mean value $\overline{\theta^{IPC}}$, averaging is carried out over the individual set point blade angles $\theta_i^{IPC}$ of the individual blade controller and a response of the blade adjustment system to the requested individual set point blade angles $\theta_i^{IPC}$ is simulated, and averaging is carried out over the simulated individual blade angles $\theta_i^{sim}$ of the simulated blade adjustment system.

4. The method according to claim 1, wherein the averaging over time is carried out over an averaging duration which is less than a duration of half a rotor revolution.

5. The method according to claim 4, wherein the duration is between 0.5 seconds and 2 seconds.

6. A system for operating a wind turbine that includes
a tower,
a rotor arranged on the tower having at least two rotor blades, wherein of each of said at least two rotor blades has an individually adjustable blade angle,
a blade adjustment system that includes a blade controller and sensors for sensing individual actual blade angles $\theta_i^{act}$ of the at least two rotor blades, and
an individual blade controller configured to receive a collective set point blade angle $\theta_c^{set}$ from the blade controller and to actuate the at least two rotor blades with individual set point blade angles $\theta_i^{IPC}$, respectively,
said system comprising a monitoring device configured to:
form a difference signal based upon a difference between
  (a) a collective blade angle actual mean value $\overline{\theta^{act}}$ and a collective blade angle set point mean value $\overline{\theta^{IPC}}$;
  (b) the collective set point mean value $\overline{\theta^{IPC}}$ and the collective set point blade angle $\theta_c^{set}$; or
  (c) the collective set point blade angle $\theta_c^{set}$ and a collective actual mean value $\overline{\theta^{act}}$;
average the difference signal over time to obtain an averaged over time value;
monitor the averaged over time value to determine whether at least one limiting value is exceeded in absolute terms; and
reduce an operation of the wind turbine with respect to load when the averaged over time value exceeds the at least one limiting value in absolute terms and determine a malfunction of:
  (i) a blade adjustment drive or a blade bearing where the difference signal is based upon the difference between (a) the collective blade angle actual mean value $\overline{\theta^{act}}$ and the collective blade angle set point mean value $\overline{\theta^{IPC}}$; or
  (ii) the individual blade controller where the difference signal is based upon the difference between either (b) the collective set point mean value $\overline{\theta^{IPC}}$ and the collective set point blade angle $\theta_c^{set}$ or (c) the collective set point blade angle $\theta_c^{set}$ and the collective actual mean value $\overline{\theta^{act}}$.

7. The system according to claim 6, wherein the monitoring device is integrated into an operational control system or into the blade adjustment system of the wind turbine.

8. A wind turbine comprising:
a tower;
a rotor arranged on the tower having at least two rotor blades, wherein of each of said at least two rotor blades has an individually adjustable blade angle;
a blade adjustment system that includes a blade controller and sensors for sensing individual actual blade angles $\theta_i^{act}$ of the at least two rotor blades;
an individual blade controller configured to receive a collective set point blade angle $\theta_c^{set}$ from the blade controller and to actuate the at least two rotor blades with individual set point blade angles $\theta_i^{IPC}$, respectively; and
a system for operating a wind turbine according to claim 6.

9. A system for monitoring an individual blade adjustment of a wind turbine that includes
a tower,
a rotor arranged on the tower having at least two rotor blades, wherein of each of said at least two rotor blades has an individually adjustable blade angle,
a blade adjustment system that includes a blade controller and sensors for sensing individual actual blade angles $\theta_i^{act}$ of the at least two rotor blades, and
an individual blade controller configured to receive a collective set point blade angle $\theta_c^{set}$ from the blade controller and to actuate the at least two rotor blades with individual set point blade angles $\theta_i^{IPC}$, respectively,
wherein the system comprises:
a monitoring device configured to:
form a difference signal based upon a difference between
  (a) a collective blade angle actual mean value $\overline{\theta^{act}}$ and a collective blade angle set point mean value $\overline{\theta^{IPC}}$;
  (b) the collective set point mean value $\overline{\theta^{IPC}}$ and the collective set point blade angle $\theta_c^{set}$; or
  (c) the collective set point blade angle $\theta_c^{set}$ and a collective actual mean value $\overline{\theta^{act}}$;
average the difference signal over time to obtain an averaged over time value; and
monitor the averaged over time value to determine whether at least one limiting value is exceeded in absolute terms; and means configured to carry out a method according to claim 1.

* * * * *